(12) United States Patent
Zhang

(10) Patent No.: US 12,510,382 B2
(45) Date of Patent: Dec. 30, 2025

(54) SEGMENTED SENSOR ENCLOSURES

(71) Applicant: Pony.ai, Inc., Fremont, CA (US)

(72) Inventor: Xiaocheng Zhang, San Jose, CA (US)

(73) Assignee: Pony.ai, Inc., Fremont, CA (US)

( * ) Notice: Subject to any disclaimer, the term of this patent is extended or adjusted under 35 U.S.C. 154(b) by 158 days.

(21) Appl. No.: 18/144,165

(22) Filed: May 5, 2023

(65) Prior Publication Data

US 2024/0369387 A1     Nov. 7, 2024

(51) Int. Cl.

| | |
|---|---|
| *G01D 11/24* | (2006.01) |
| *B60S 1/52* | (2006.01) |
| *B60S 1/56* | (2006.01) |
| *G01S 7/481* | (2006.01) |
| *G01S 17/931* | (2020.01) |
| *G01S 19/36* | (2010.01) |
| *H01Q 1/32* | (2006.01) |
| *H04N 23/90* | (2023.01) |
| *B60R 16/023* | (2006.01) |
| *G01S 7/497* | (2006.01) |

(52) U.S. Cl.
CPC .............. *G01D 11/245* (2013.01); *B60S 1/52* (2013.01); *B60S 1/56* (2013.01); *G01S 7/4813* (2013.01); *G01S 17/931* (2020.01); *G01S 19/36* (2013.01); *H01Q 1/3233* (2013.01); *H04N 23/90* (2023.01); *B60R 16/0238* (2013.01); *G01S 2007/4977* (2013.01)

(58) Field of Classification Search
CPC ... G01D 11/245; G01S 17/931; G01S 7/4813; G01S 19/36; B60S 1/52; B60S 1/56; H04N 23/90
See application file for complete search history.

(56) References Cited

U.S. PATENT DOCUMENTS

2023/0266440 A1 * 8/2023 Acharya ............... G01S 17/931
356/4.01

FOREIGN PATENT DOCUMENTS

DE        102018115498 A1 * 1/2019 ............. B60R 11/04

* cited by examiner

*Primary Examiner* — Jamel E Williams
(74) *Attorney, Agent, or Firm* — Sheppard, Mullin, Richter & Hampton LLP; Xin Xie

(57) ABSTRACT

Provided herein is a sensor enclosure assembly. The sensor assembly includes a first enclosure positioned at a front of a vehicle roof, and a second enclosure positioned at a rear of the vehicle roof. The first enclosure and the second enclosure each include sensors, which include at least two cameras, and at least one Lidar, cleaning nozzles that direct a fluid towards an exterior cover of the first enclosure or the second enclosure, and a fan disposed within an interior of the first enclosure or the second enclosure and facing towards vents on an exterior of the first enclosure or the second enclosure.

20 Claims, 15 Drawing Sheets

SEGMENTED SENSOR ENCLOSURES

TECHNICAL FIELD

The present disclosure relates generally to a sensor enclosure.

BACKGROUND

On-board sensors in vehicles, such as autonomous vehicles (AVs), supplement and bolster the vehicles' field of vision by providing accurate sensor data. Sensor data is utilized, for example, in applications of blind spot detection, lane change assisting, rear end radar for collision warning or collision avoidance, park assisting, cross-traffic monitoring, brake assisting, emergency braking, and/or automatic distance controlling. Examples of on-board sensors include, for example, passive sensors and active sensors. On-board sensors include camera, Lidar, radar, GPS, sonar, ultrasonic, IMU (inertial measurement unit), accelerometers, gyroscopes, magnetometers, and FIR (far infrared) sensors. Sensor data may include image data, reflected laser data, and/or the like. Often, images captured by the on-board sensors utilize a three-dimensional coordinate system to determine a distance and angle of the objects and features captured in the image. Such real-time space information may be acquired near the vehicles using various on-board sensors located throughout the vehicles, which may then be processed to calculate and to determine the safe driving operations of the vehicles. Often, on-board sensors are exposed to harsh environmental elements (e.g., large temperature swings, ultra violet radiation, oxidation, wind, moisture, etc.), which can prematurely shorten the sensors' lifetimes. Furthermore, mounting the sensors exterior to the vehicles can subject the sensors to an increased risk of impact from road debris, thereby increasing a possibility of damaging the sensors. To alleviate these and other problems, a sensor enclosure may be used to house the sensors. Such a sensor enclosure may offer additional protection against environmental elements and road debris while still allowing the sensors to function or operate. However, encasing sensors in current sensor enclosures can create operational challenges which can lead to sensor malfunction.

SUMMARY

Described herein are sensor enclosures.

A sensor enclosure assembly may include a first enclosure positioned at a front of a vehicle roof, and a second enclosure positioned at a rear of the vehicle roof, wherein: the first enclosure and the second enclosure each comprise: sensors comprising at least two cameras, and at least one Lidar; cleaning nozzles configured to direct a fluid towards an exterior cover of the first enclosure or the second enclosure; and a fan disposed within an interior of the first enclosure or the second enclosure and facing towards vents on an exterior of the first enclosure or the second enclosure.

In some embodiments, the second enclosure comprises two antennae assemblies, wherein the antennae assemblies comprise a GNSS antenna and a cellular, mobile, or radio (hereinafter "cellular") antenna. For example, the cellular antenna can include a 2.4 GHz, 5 GHz, 5.8 GHz, or 6 GHz antenna.

In some embodiments, the first enclosure comprises four cameras, wherein a first camera comprises a field of view of 30 degrees, a second camera comprises a field of view of 120 degrees, and a third camera comprises a field of view of 60 degrees.

In some embodiments, the first enclosure and the second enclosure each comprise: a base plate mounted to the vehicle roof or to a rack positioned on the vehicle roof; and three adapters that are adapted or adhered to the base plate onto the vehicle roof or to the rack. The adapters may include mechanical components such as fasteners, and/or chemical adhesives or glue (e.g., urethane).

In some embodiments, the second enclosure comprises a junction box disposed between the two antennae assemblies, wherein the junction box comprises GNSS antenna receiver electronics or circuitry, cellular antenna receiver electronics or circuitry, and time synchronization electronics or circuitry to synchronize metadata to a GNSS clock, wherein the metadata comprises timestamps corresponding to sensor data captured from one or more of the sensors.

In some embodiments, the two antennae assemblies are positioned above the sensor mount bracket.

In some embodiments, the first enclosure and the second enclosure each comprise: a sensor mount bracket positioned atop the base plate and upon which the sensors are disposed.

In some embodiments, the second enclosure comprises vents disposed on three different sides of the second enclosure.

In some embodiments, the second enclosure comprises a higher number of sensors compared to the first enclosure.

In some embodiments, the second enclosure comprises a horizontal axis and a perpendicular axis intersecting through a center of the second enclosure, and the second enclosure comprises a GNSS antenna assembly that is equidistant to a cellular antenna assembly with respect to the perpendicular axis.

In some embodiments, one or more electronic controllers are configured to regulate one or more operations of the sensor enclosure assembly, wherein the operations comprise operations associated with the sensors.

In some embodiments, the electronic controllers are further configured to perform: determining a concentration of contaminants or dust within a particular component or region of the first sensor enclosure or the second sensor enclosure; determining that the concentration of contaminants or dust exceeds a threshold concentration; and in response to determining that the concentration of contaminants or dust exceeds a threshold concentration, activating one or more of the cleaning nozzles to direct the fluid towards the particular component or region.

In some embodiments, the electronic controllers are further configured to perform: determining a rate of change over time of a concentration of contaminants or dust within a particular component or region of the first sensor enclosure or the second sensor enclosure; determining that the rate of change of the concentration of contaminants or dust exceeds a threshold rate; and in response to determining that the rate of change of the concentration of contaminants or dust exceeds a threshold rate, activating one or more of the cleaning nozzles to direct the fluid towards the particular component or region.

In some embodiments, the electronic controllers are further configured to perform: determining an air quality index (AQI) within a particular component or region of the first sensor enclosure or the second sensor enclosure; determining that the AQI exceeds a threshold rate; and in response to determining that the AQI exceeds a threshold rate, activating one or more of the cleaning nozzles to direct the fluid towards the particular component or region.

In some embodiments, the electronic controllers are further configured to perform: determining a rate of change of an air quality index (AQI) within a particular component or region of the first sensor enclosure or the second sensor enclosure; determining that the rate of change of the AQI exceeds a threshold rate; and in response to determining that the rate of change of the AQI exceeds a threshold rate, activating one or more of the cleaning nozzles to direct the fluid towards the particular component or region.

In some embodiments, the electronic controllers are further configured to perform: determining an intensity or a rate of output of the one or more of the cleaning nozzles based on the concentration of contaminants or dust, and wherein the activating of the one or more of the cleaning nozzles comprises activating the one or more of the cleaning nozzles according to the intensity or the rate of output.

In some embodiments, the electronic controllers are further configured to perform: determining a first power level to be supplied to the first enclosure based on a density of traffic in a region within a threshold distance of the first enclosure.

In some embodiments, the electronic controllers are further configured to perform: determining a level of activation of first sensors within the first enclosure based on a density of traffic in a region within a threshold distance of the first enclosure.

In some embodiments, the electronic controllers are further configured to perform: determining a second power level to be supplied to the second enclosure based on a density of traffic in a region within a threshold distance of the second enclosure.

In some embodiments, the electronic controllers are further configured to perform: determining a first level of activation of first sensors within the first enclosure based on a first density of traffic in a first region within a threshold distance of the first enclosure; and determining a second level of activation of second sensors within the first enclosure based on a second density of traffic in a second region within a threshold distance of the second enclosure, wherein the first level of activation is different from the second level of activation.

These and other features of the systems and methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates a view of the front enclosure.

DETAILED DESCRIPTION

Figure 1:
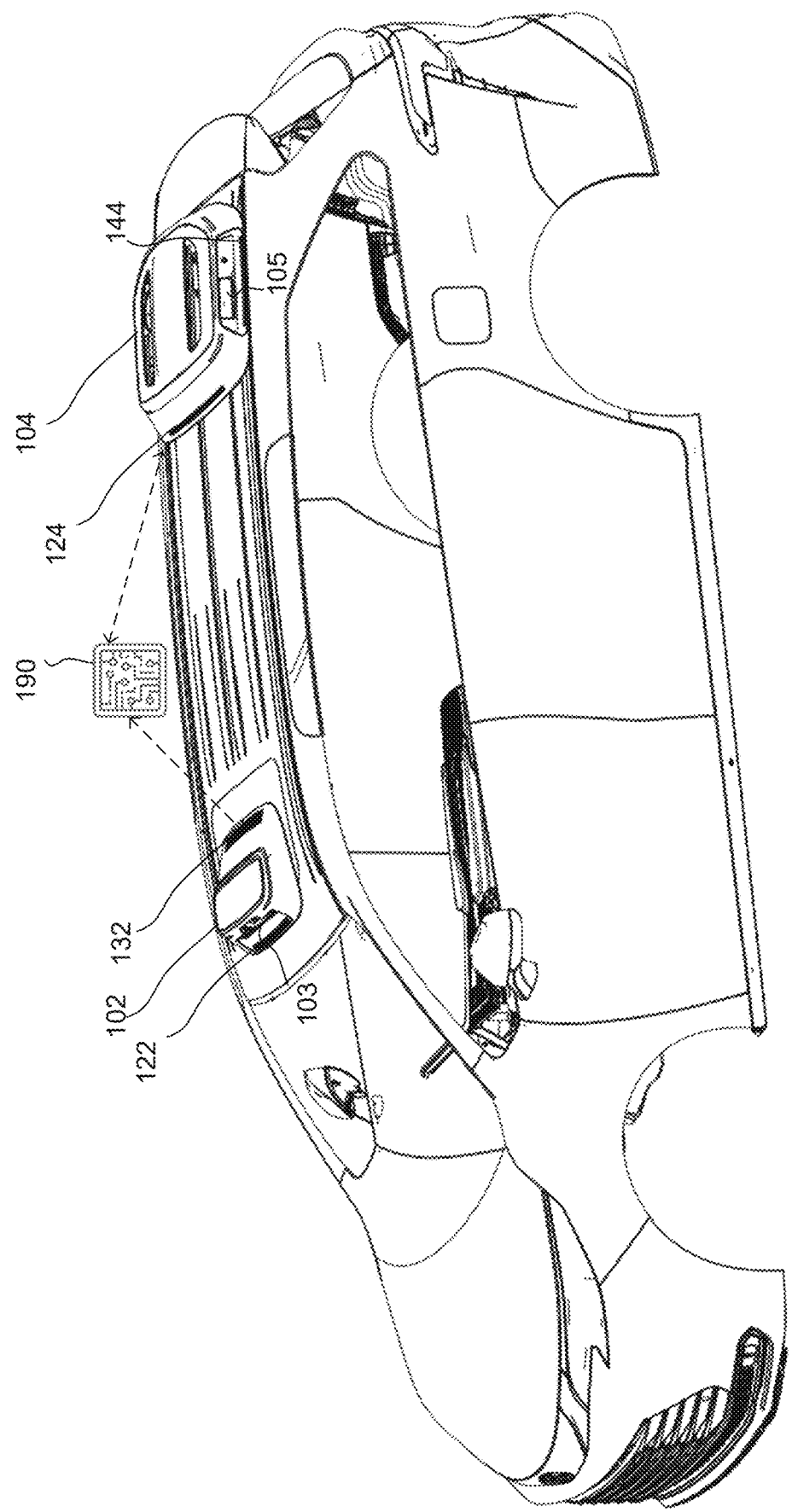
FIG. 1 illustrates an example layout of a sensor assembly on a roof of a vehicle.

In general, a vehicle (e.g., an autonomous vehicle, a driverless vehicle, etc.) can have myriad sensors onboard the vehicle. The myriad sensors can include light detection and ranging sensors (or Lidars), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, Lidar can be utilized to detect and identify objects (e.g., other vehicles, road signs, pedestrians, buildings, etc.) in a surrounding. Lidar can also be utilized to determine relative distances of objects in the surrounding. For another example, radars can be utilized to aid with collision avoidance, adaptive cruise control, blind side detection, assisted parking, etc. For yet another example, camera can be utilized to recognize, interpret, and/or analyze contents or visual cues of objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by one or more sensors.

Various embodiments overcome problems specifically arising in the realm of autonomous vehicle technology. In various embodiments, the myriad sensors (e.g., Lidars, cameras, etc.) onboard the autonomous vehicle can be encased or housed in an enclosure. Some of the current limitations of sensor enclosures are that they are aerodynamically inefficient. For example, current sensor enclosures mounted onto a roof of a vehicle may be aerodynamically inefficient due to an air gap introduced between a portion of the sensor enclosure and the vehicle, which may cause lift forces underneath the sensor enclosure. Additionally, GPS receivers and antennas may also be mounted on exteriors of vehicles, outside of sensor enclosures. Such positioning of the GPS receivers and antennas may cause further aerodynamic inefficiencies.

To address these and other limitations, in some embodiments, an enclosure assembly includes numerous enclosures or enclosure sections or segments, such as two enclosures, enclosure segments, or enclosure sections, instead of a single enclosure. Because each enclosure would have a smaller contact area with a roof rack or a roof of a vehicle, each enclosure may fit a contour or curvature of a portion of the roof or the roof rack more tightly, thus improving aerodynamic efficiency. In some examples, one or more of the enclosures or enclosure sections may be directly attached to the roof, such as via epoxying, without mounting to a roof rack. In other examples, one or more of the enclosures or enclosure sections may be attached to a corresponding roof rack, which may be attached to the roof, such as via epoxying. For example, if the enclosure assembly includes two enclosures or enclosure sections, a front enclosure or enclosure section (hereinafter "enclosure") may be directly mounted onto the roof without a roof rack while a rear or back enclosure or enclosure section may be mounted onto a roof rack. In that example, the rear or back enclosure may be larger and/or wider than the front enclosure, and the roof rack may be positioned near the left and right edges of the vehicle, such that the rear or back enclosure may be aligned with the width of the roof rack.

Furthermore, having multiple enclosures rather than a single enclosure in an assembly may have the benefit of increasing versatility of an autonomous or semi-autonomous vehicle. In particular, a level of autonomous driving (i.e., a level of autonomy) may be adjusted depending on a number of enclosures on the roof of the vehicle. For example, a lower level of autonomous driving or automation may encompass only a single enclosure being installed or active, while a higher level of autonomous driving or automation may encompass two enclosures being installed or active. For instance, in some embodiments, implementation of a level two or level two-plus autonomy may require a single enclosure assembly configuration, and implementation of a level four autonomy may require two-enclosure assembly configuration. Therefore, depending on a particular destination or purpose, a number of enclosures activated or installed may be adjusted to match a desired level of autonomous driving. In particular, to match a lower desired level of autonomous driving, only one enclosure may be installed. Adjusting a number of enclosures in such a manner may flexibly confer a tradeoff between a level of aerodynamic efficiency, cost, and/or weight on a vehicle compared to a degree or level of autonomous driving.

Moreover, dividing an enclosure assembly into multiple segments or sections may further confer a benefit of flexibly controlling each individual enclosure. For example, depending on current driving conditions and/or a specific driving expedition, one or more electronic controllers that coordinate or control operations of each enclosure segment or section may adjust power consumed by or provided to each individual enclosure segment or section. In this example, if a traffic density and/or a density of objects in a region surrounding a vehicle is below a threshold level behind the vehicle, then the one or more electronic controllers may decrease power consumed by or provided to the rear enclosure. Thus, the one or more electronic controllers may control each enclosure segment or section to consume different amounts of power.

An example enclosure assembly may include a front enclosure segment and a rear or back enclosure segment. Each of the front enclosure segment and the rear enclosure segment may include a base structure which attaches to a roof rack or a roof, a sensor mount positioned onto the base structure and upon which sensors are disposed, an accessory ensemble or accessory section that includes a dual fan, sensor cleaner, a filter such as an air filter, as well as a cover which may be composed of glass. In some examples, the sensor mount may be positioned on top of the accessory ensemble or accessory section.

The base structure may support the enclosure segment and may include suitable materials such as urethane, and be attached to the roof rack or the roof via one or more body adapters. The roof may include a glass portion (e.g., a sun or moon roof) or a metal roof. The urethane may be bonded to a glass portion of the roof, in some examples. The base structure may be fastened to the roof rack using three body adapters and bolts, such as M6 bolts, at each of the body adapters, for redundancy. A junction box which may house electronics or circuitry (e.g., circuitry of a GNSS antenna, a cellular antenna, and synchronization circuitry to synchronize metadata to a GNSS clock) may be disposed onto the base plate as well. The circuitry may contain logic programmed to synchronize timestamp information or data from sensor data, captured by one or more sensors, with a GNSS clock. A sensor mount may include a base plate positioned atop the base structure and a sensor mount positioned on the base plate. In some examples, the base plate may be epoxied directly onto a roof of the vehicle, thereby reducing or eliminating any air gaps. The base plate may conform to a silhouette of the roof. In other examples, the base plate may be affixed mechanically to a roof rack, which may be epoxied or otherwise fastened to the roof of the vehicle. The sensor mount may be attached to the base plate via M8 threads, M6 threads, washers, or bolts. In some examples, for instance, on the rear enclosure and/or the front enclosure, the base plate may be laser cut. A sensor mount bracket attaches or fixes each sensor onto the sensor mount while providing ingress protection or water deflection. The sensor mount may include glass and/or plastic. Any openings of a Lidar, such as those located at positions at which the Lidar is attached to the sensor mount, may be sealed with foam (e.g., Nitto foam). Each sensor may be mounted to a common, connected segment of the sensor mount. The front enclosure section and the rear enclosure section may include any number of cameras and/or Lidars. In some examples, a number of cameras and Lidars in the front enclosure section and the rear enclosure section may be equal. In some examples, the front enclosure section and/or the rear enclosure section may include two cameras or four cameras. For example, in a scenario with four cameras, such as on the front enclosure segment, one or more of the cameras may have different fields of view. Specifically, a first camera may have approximately a 60 degree field of view, a second camera may have approximately a 30 degree field of view, and two other cameras (e.g., third cameras) may have approximately 120 degree fields of view. In this example, the first camera may be configured to monitor for traffic lights. The second camera may have telephoto lenses. At least one of the cameras may be tilted upwards to provide an elevational field of view. As a result, having different cameras with different fields of view may provide a comprehensive view of surroundings along different axes and/or elevations. In some examples, the front sensor enclosure may have four cameras and a Lidar, such as a front-facing Lidar. In some examples, the rear sensor enclosure may have three Lidars and one or more cameras. For example, the rear sensor enclosure may have three cameras.

In the accessory ensemble or accessory section, a fan may be included. In some examples, the fan can be a quad fan. A cleaner may include a control valve with a bracket. A nozzle may be mounted to a nozzle mount. The nozzle may be disposed at an end of a hose or channel. A routing of the hose may be electronically controlled. For example, a hose may be moved between one or more openings to apply fluid (e.g., gas or liquids) upon detection of at least a threshold concentration of contaminants in one area or section of the enclosure. Alternatively or additionally, the hose may be moved within the sensor enclosure to provide cleaning in one area or a range of areas depending on a concentration of contaminants in different areas of the sensor enclosure. Air nozzles may be disposed near an enclosure cover to output air and clean a glass surface of a sensor enclosure. The air nozzles may be positioned either on an outside or an inside of the sensor enclosure to clean either an inside cover of the sensor enclosure and/or an outside cover of the sensor enclosure. Furthermore, fans may draw in outside air via an air filter to pressurize the air, via a pump.

A rear enclosure may include a Global Navigation Satellite System (GNSS) antenna or a Global Positioning System (GPS) antenna and a removable GNSS antenna cover. In some examples, the rear enclosure may further include a cellular, radio, or mobile antenna, such as a 2.4 GHz, 5 GHZ, 5.8 GHz, or 6 GHz antenna, as well as a corresponding antenna cover. In some examples, the GNSS antenna may be lofted or positioned above the base plate and/or the sensor mount. The GNSS antenna may transmit signals through a glass cover of the enclosure.

Figure 2:
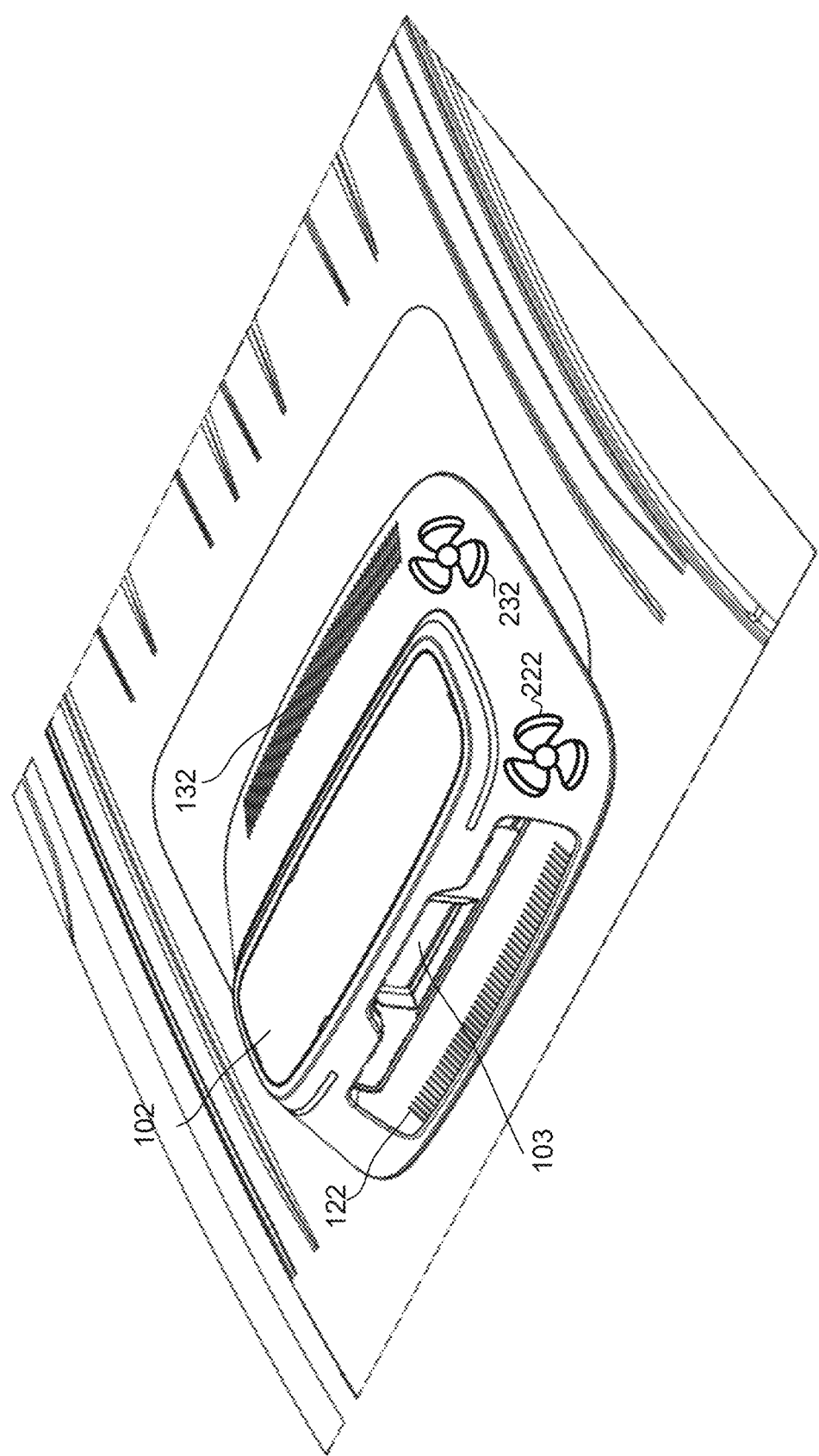
FIGS. 2, 3A, and 3B illustrate views of a front enclosure.

FIGS. 1 and 2 illustrate an example layout of a sensor assembly and an example sensor enclosure of a vehicle. In FIG. 1, a first enclosure, enclosure section, or enclosure segment (hereinafter "first enclosure") 102 includes vents 122 and 132 for cooling, and an opening or recess 103. In some examples, the vent 122 may be an inflow vent while the vent 132 may be an outflow vent. In other examples, the vent 132 may be an inflow vent while the vent 122 may be an outflow vent. The first enclosure 102 may be positioned at a front of the roof. Within an interior of the first enclosure 102, facing the vents 122 and 132, may be one or more fans 222 and 232, respectively, as shown in FIG. 2. The one or more fans 222 and 232 may draw in an inlet airflow from an exterior of the first enclosure 102. The one or more fans 222 and 232 may be DC (direct current) fans, in some examples. In some examples, one or more electronic controllers 190 may contain logic, protocols, and/or programming to regulate a rotation speed of the one or more fans 222 and 232 based on a speed of the vehicle, a temperature within an interior of the sensor enclosure, an external temperature outside of the sensor enclosure, an amount of use or computing load of any of the sensors, and/or a humidity within the sensor enclosure. In some examples, the one or more electronic controllers 190 may further adjust a rotation speed of the one or more fans 222 and 232, and/or an amount of air entering the first enclosure 102, based on one or any combination of predicted future conditions, such as anticipated speed, anticipated external temperature, or anticipated internal temperature of the sensor enclosure. For example, if the one or more electronic controllers 190 predict, based on a navigation route selected, or based on a weather forecast, that a temperature at a destination is high, the one or more electronic controllers 190 may preemptively precool the first enclosure 102 by increasing rotation speed or speeds of the one or more fans 222 and 232. As another example, if the one or more electronic controllers 190 predicts that a Lidar sensor and/or the cameras will be heavily used in a near future, the one or more electronic controllers 190 may preemptively precool the first enclosure 102 by increasing the rotation speed of the one or more fans 222 and 232. As another example, if the one or more electronic controllers 190 predict that the vehicle speed will increase based on a type of road (e.g., highway), traffic conditions, road conditions, and/or amount of battery/gasoline remaining, the electronic controllers may preemptively precool the sensor enclosure by increasing the rotation speed of the one or more fans 222 and 232.

A second enclosure 104 includes vents 124 and 144, and an opening or recess 105. The second enclosure 104 may be positioned at a rear of the roof. In some examples, the second enclosure 104 may be larger than the first enclosure 102. In some examples, as functionally depicted, the vehicle may include the one or more electronic controllers 190. The one or more electronic controllers 190 may include hardware processors, software and/or firmware configured to control, regulate or coordinate functions within the first enclosure 102 and the second enclosure 104, as will be described in subsequent figures such as FIGS. 7 and 8. In some examples, the one or more electronic controllers 190 may be spatially separated so that one electronic controller or set of electronic controllers controls the first enclosure 102 while a different electronic controller or set of electronic controllers controls the second enclosure 104.

Figure 3A:
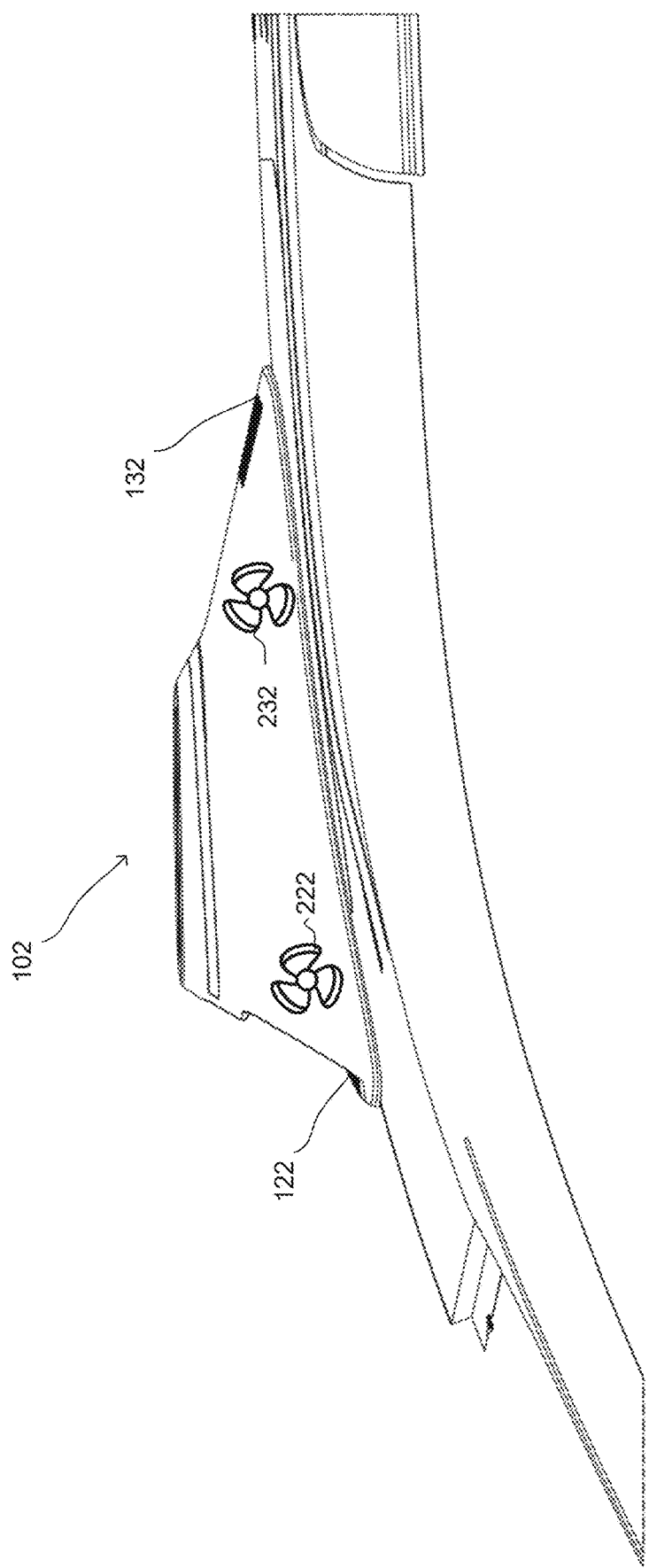
Figure 3B:
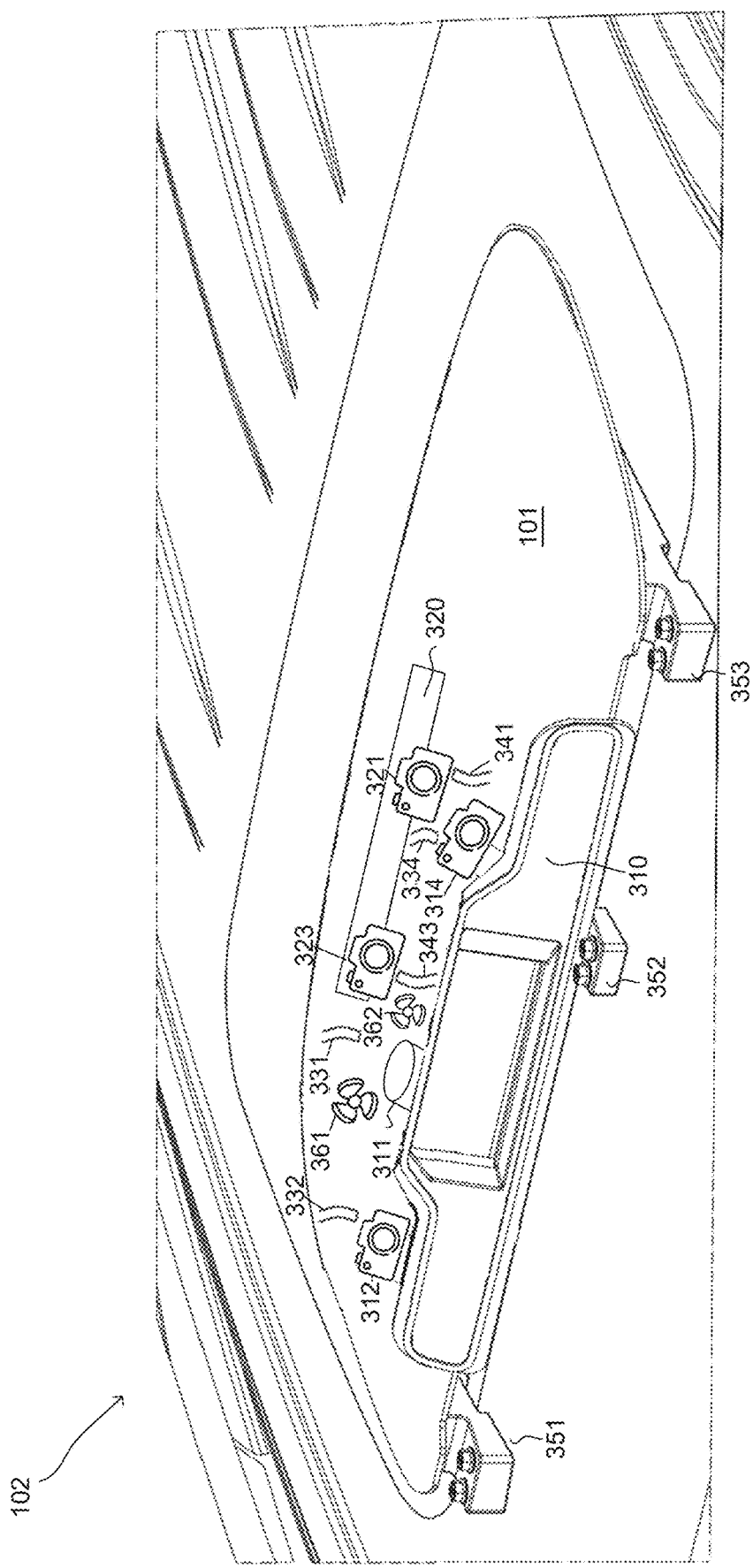

FIGS. 2 and 3A-3B illustrate views of the first enclosure 102. In particular, the vents 122 and 132, the one or more fans 222 and 232, and the opening or recess 103, is illustrated in FIGS. 2 and 3A-3B. FIG. 3B illustrates some interior aspects of the first enclosure 102. In particular, in FIG. 3B, adapters, attachments, or mounts (hereinafter "adapters") 351, 352, and 353 may secure a bottom surface, or a base plate 101, onto a roof or roof rack of the vehicle. The adapters 351, 352, and 353 may each have one or more fasteners such as bolts. In some examples, the base plate 101 may be epoxied onto the roof or a glass panel of the roof, and the adapters 351, 352, and 353 may be redundant fasteners that provide an additional attachment mechanism. For example, the base plate 101 may be epoxied onto a previously sliding portion of the glass panel and the adapters 351, 352, and 353, upon attachment to the glass panel, may stop or prevent sliding of the sliding portion of the glass panel. In some examples, an interior of the first enclosure 102 may include one or more sensor mounts on which sensors are positioned. The one or more sensor mounts may include a sensor mount 310 and a sensor mount 320. The sensor mounts 310 and 320, or at least portions thereof, may be oriented substantially or approximately perpendicular with respect to base plate 101. In some examples, a first portion of the sensor mount 310 or 320 may be substantially or approximately perpendicular to the base plate 101 while a second portion of the sensor mount 310 or 320 may be substantially parallel to the base plate 101. Here, substantially or approximately may encompass a variation of anywhere between 0 to 5 percent, 0 to 10 percent, 0 to 20 percent, or any suitable range. For example, substantially or approximately may mean +/−1 percent, +/−2 percent, +/−3 percent, +/−4 percent, +/−5 percent, or any numerical value up to +/−20 percent.

A Lidar 311, and cameras 312 and 314, may be secured onto the sensor mount 310. The Lidar 311, in some examples, may include a solid state Lidar. Meanwhile, a camera 321 and a camera 323, may be secured onto the sensor mount 320. One of the aforementioned cameras 312, 314, 321, and 323 may have a 30-degree field of view, another of the aforementioned cameras may have a 60-degree field of view, and two remaining cameras may have a 120-degree field of view. In some examples, cleaning nozzles may be positioned to output fluid, such as gas or liquid, towards any or each of the aforementioned sensors (e.g., the Lidar 311, the cameras 312, 314, 321, and 323). Each cleaning nozzle may have, or be associated with, its own fluid source (e.g., air source, liquid source) which may be from a fluid channel or a fluid reservoir. The fluid source or fluid sources may be located in the accessory ensemble while the cleaning nozzles may be attached to or otherwise contacting a respective sensor mount (e.g., the sensor mount 310, 320, or 330). For example, In other examples, at least some of the cleaning nozzles may obtain fluid from a common fluid source. In particular, cleaning nozzles 332, 333, 334, 335, 343, 344, 341, 342, and 331 may be directed to the camera 312, the camera 314, the camera 323, the camera 321, and the Lidar 311, respectively. In some examples, instead of one cleaning nozzle being directed to each sensor, one cleaning nozzle may be directed to a camera pair, or for a group of sensors. Additionally, fans 361 and 362 may be configured to cool the Lidar 311. The fans 361 and 362 within a threshold distance of the Lidar 311, and/or to opposite sides of the Lidar 311.

Figure 4:
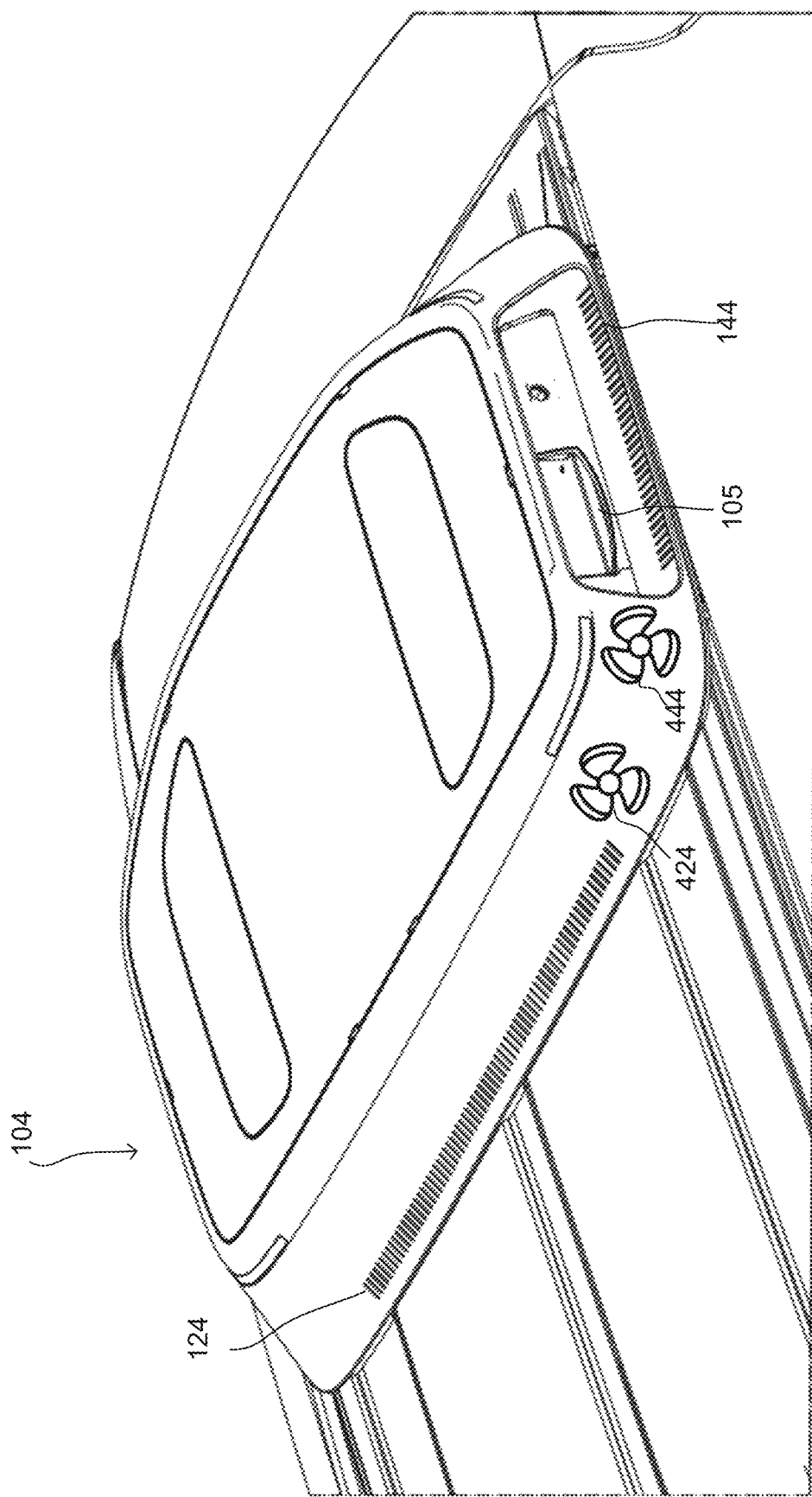
FIGS. 4, 5, and 6A-6D illustrate views of a rear enclosure.
Figure 5:
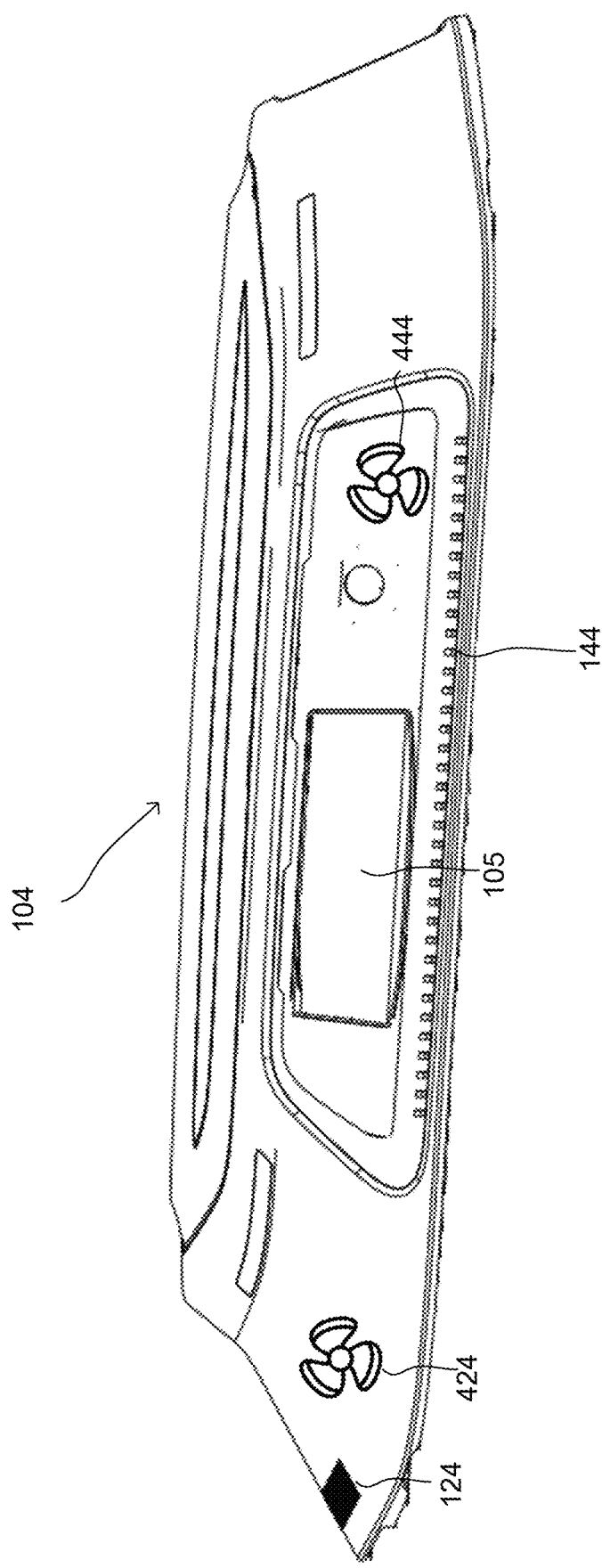

FIGS. 4 and 5 illustrates views of the second enclosure 104. In particular, the vents 124 and 144, one or more fans 424 and 444 disposed opposite of the vents 124 and 144, respectively, and the opening or recess 105 are illustrated. The one or more fans 424 and 444 may be implemented in a same or analogous manner as the one or more fans 222 and 232, and may be operated upon by the one or more electronic controllers 190 in a same or similar manner as the one or more fans 222 and 232. In some examples, wherein the first enclosure 102 may have two fans, the second enclosure 104 may have more fans than the first enclosure 102, such as four fans, due to a higher number of sensors within the second enclosure 104.

Figure 6A:
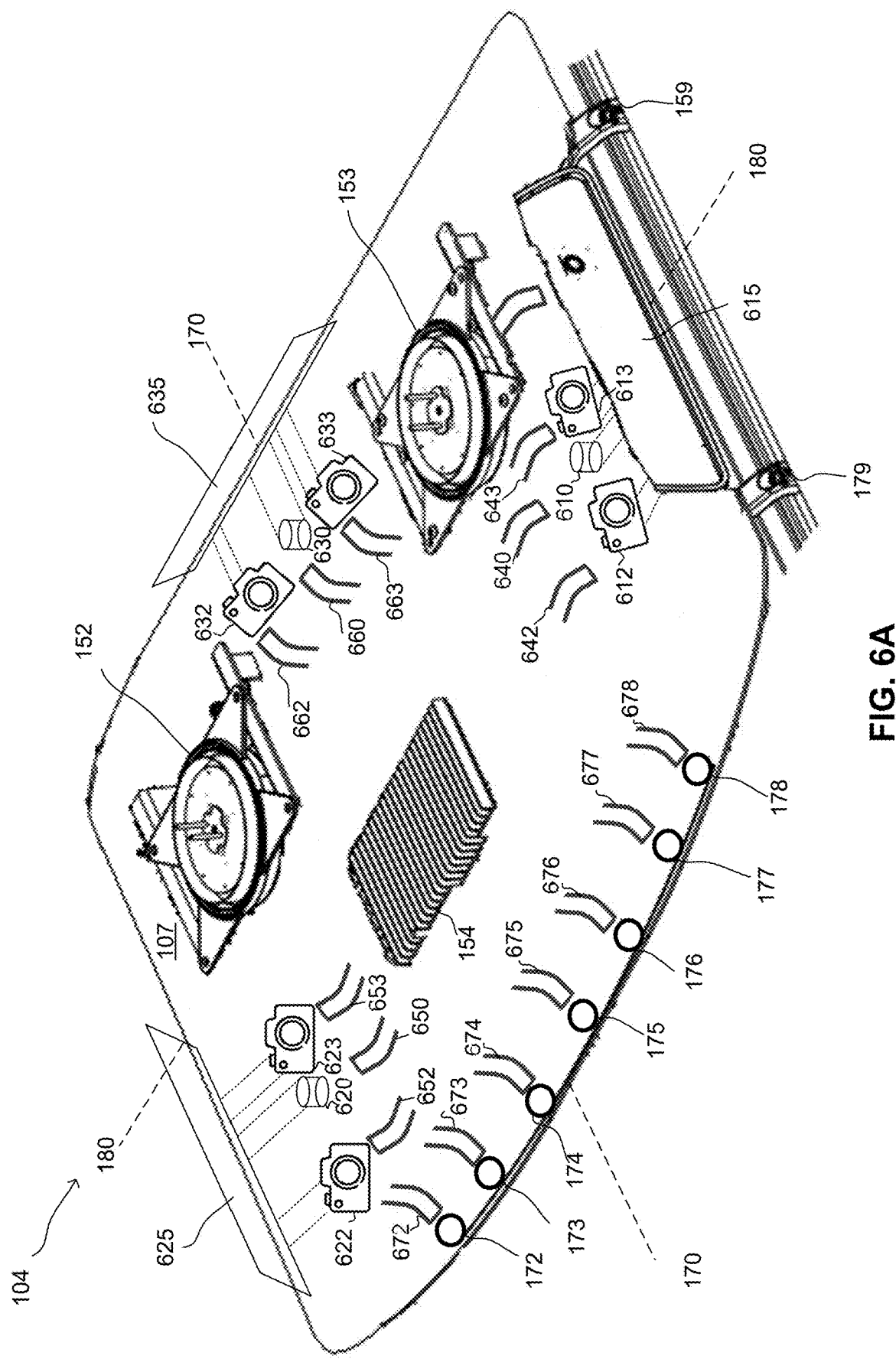
Figure 6B:
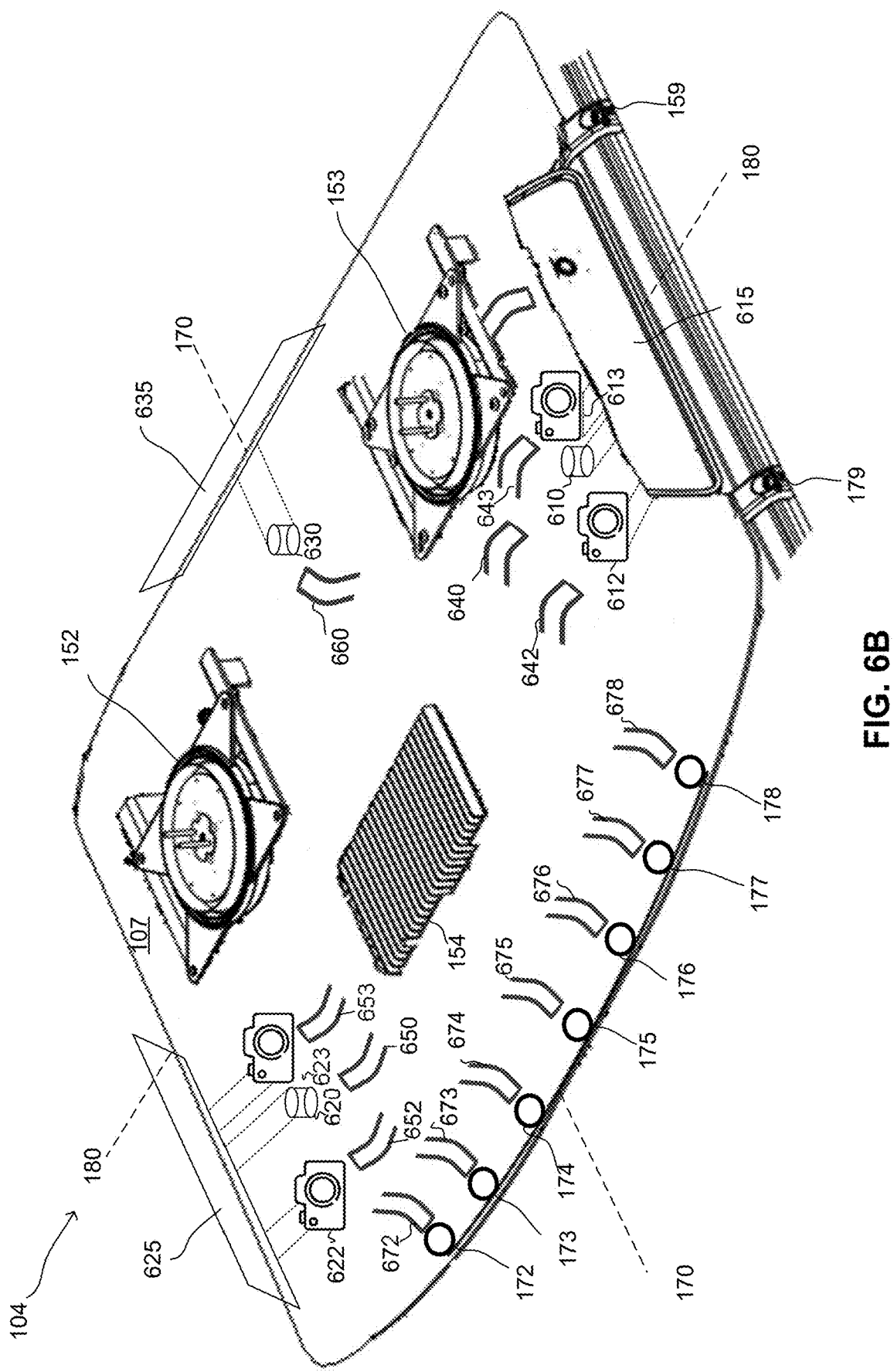
Figure 6C:
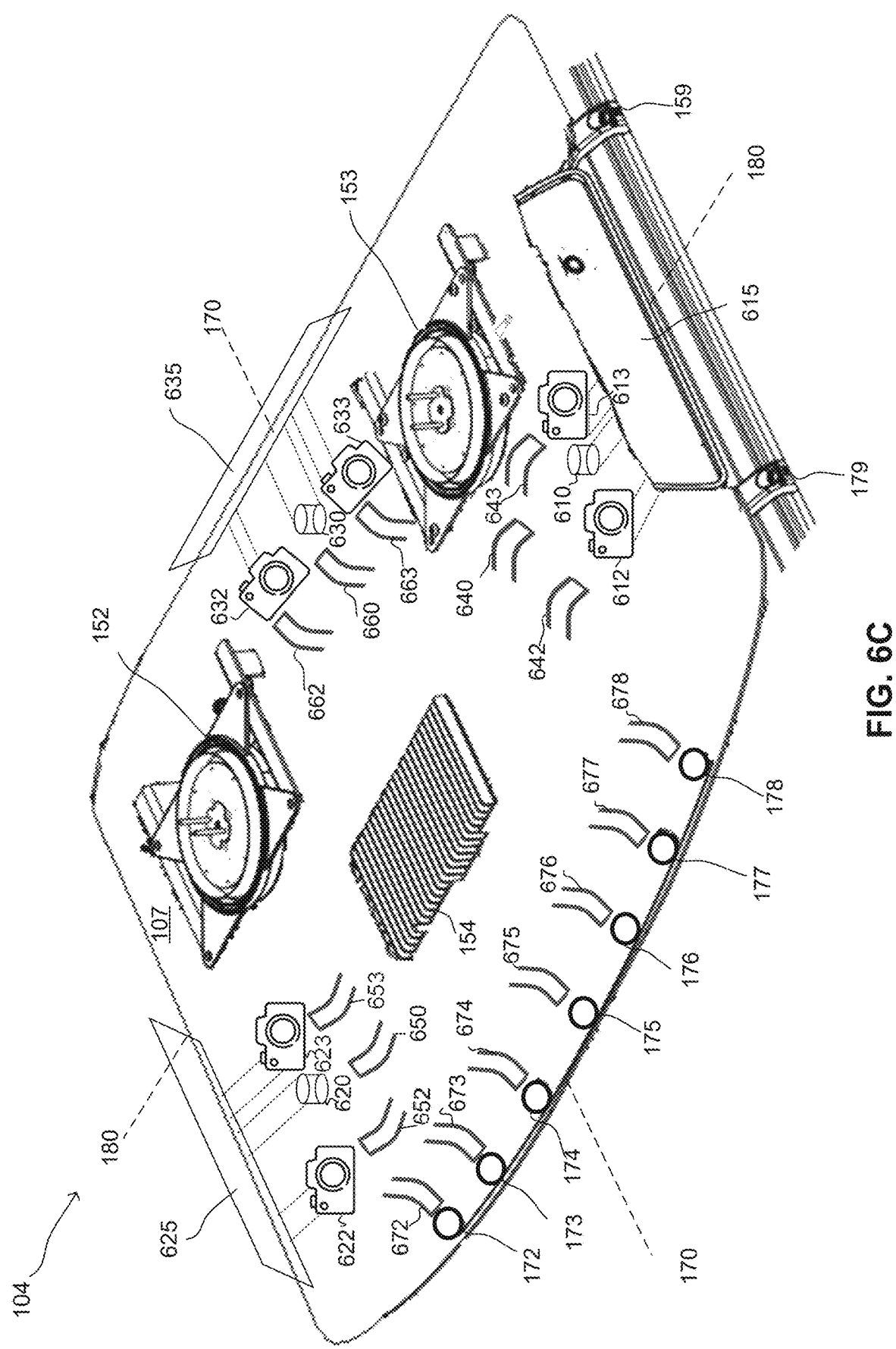

FIGS. 6A-6C illustrate some interior aspects of the second enclosure 104. In particular, in FIG. 6A, adapters, attachments, or mounts (hereinafter "adapters") 159 and 179 may secure a bottom surface, or a base plate 107, onto a roof or roof rack of the vehicle. The adapters 159 and 179 may each have one or more fasteners such as bolts. In some examples, an interior of the first enclosure 102 may include one or more sensor mounts on which sensors are positioned. The one or more sensor mounts may include sensor mounts 615, 625, and 635. The sensor mounts 615, 625, and 635, or at least portions thereof, may be oriented substantially or approximately perpendicular with respect to base plate 107. In some examples, a first portion of the sensor mount 615, 625, or 635 may be substantially or approximately perpendicular to the base plate 107 while a second portion of the sensor mount 615, 625, or 635 may be substantially parallel to the base plate 101.

Any of a Lidar 610, and cameras 612 and 613, may be secured onto the sensor mount 615. Next, any of a Lidar 620, and cameras 622 and 623 may be secured onto the sensor mount 625. Meanwhile, any of a Lidar 630, and cameras 633 and 633, may be secured onto the sensor mount 635. The Lidars 610, 620, and 630, in some examples, may include a solid state Lidar. In some examples, cleaning nozzles may be configured and/or positioned to output fluid, such as gas or liquid, towards any or each of the aforementioned sensors (e.g., the Lidars 610, 620, and 630, and the cameras 612, 613, 622, 623, 632, and 633). In particular, cleaning nozzles 640, 641, 642, 643, 644, 650, 651, 652, 653, 654, 660, 661, 662, 663, and 664 may be directed to the Lidar 610, the camera 612, the camera 613, the Lidar 620, the camera 622, the camera 623, the Lidar 630, the camera 632, and the camera 633, respectively. In some examples, instead of one cleaning nozzle being directed to each sensor, one cleaning nozzle may be directed to a camera pair, or for a group of sensors. Additionally, within a threshold distance of each of the Lidars 610, 620, and 630, or to a side of each of the Lidars 610, 620, and 630 may be one or more fans, in a same or analogous manner as the fans 361 and 362 disposed within a threshold distance of or to opposite sides of the Lidar 311 in FIG. 3B.

One or more nozzles 672-678 may also be configured and/or positioned to clean a cover of the second enclosure 104, such as, an exterior cover of the second enclosure 104. The one or more nozzles 672-678 may expel or output fluid through one or more openings 172-178, respectively, to supply the fluid (e.g., gas or liquid) onto the exterior cover of the second enclosure.

The second enclosure 104 also includes a GNSS antenna mount 152 upon which a GNSS antenna assembly, including a GNSS antenna and a GNSS antenna casing is positioned. The second enclosure 104 also includes a cellular antenna mount 153 upon which a cellular antenna assembly, including a cellular antenna and a cellular antenna casing, is positioned. The second enclosure 104 further includes a junction box 154 which may house circuitry 155, such as circuitry of the GNSS antenna, the cellular antenna, and synchronization circuitry. The synchronization circuitry may synchronize timestamp information or data from sensor data, captured by one or more sensors, with a GNSS clock. A diagram of operations of the junction box 154 is illustrated in FIG. 6E. In particular, the circuitry 155 may synchronize timestamp data 681 and timestamp data 683 corresponding to sensor data 680 captured by a camera (e.g., the camera 612) and sensor data 683 captured by a Lidar (e.g., the Lidar 610) to a GNSS clock 684, which may include an atomic clock. For example, the synchronization may include adjusting any of the timestamp data 681 and the timestamp data 683 by an offset equivalent to a discrepancy or deviation between a clock of the camera 612 or of the Lidar 610, and the GNSS clock 684. For example, if the clock of the camera 612 deviates from the GNSS clock by five seconds and the clock of the lidar 610 deviates from the GNSS clock by three seconds, the circuitry 155 may adjust or offset the timestamp data 681 by five seconds and adjust or offset the timestamp data 683 by three seconds to remove the deviation.

Going back to FIG. 6A, in some examples, the rear enclosure 104 may lack the junction box 154, and a junction box may instead be positioned within an interior of the vehicle. FIG. 6A further illustrates a horizontal or first axis 180 and a perpendicular or second axis 170. In some examples, the GNSS antenna mount 152, and consequently the GNSS antenna assembly, may be positioned equidistant with the cellular antenna mount 153, and consequently the cellular antenna assembly, from, or with respect to, the perpendicular or second axis 170. In particular, a distance from the GNSS antenna mount 152 to the perpendicular or second axis 170 may be equal or substantially equal to a distance from the cellular antenna mount 153 to the perpendicular or second axis 170.

Figure 6D:
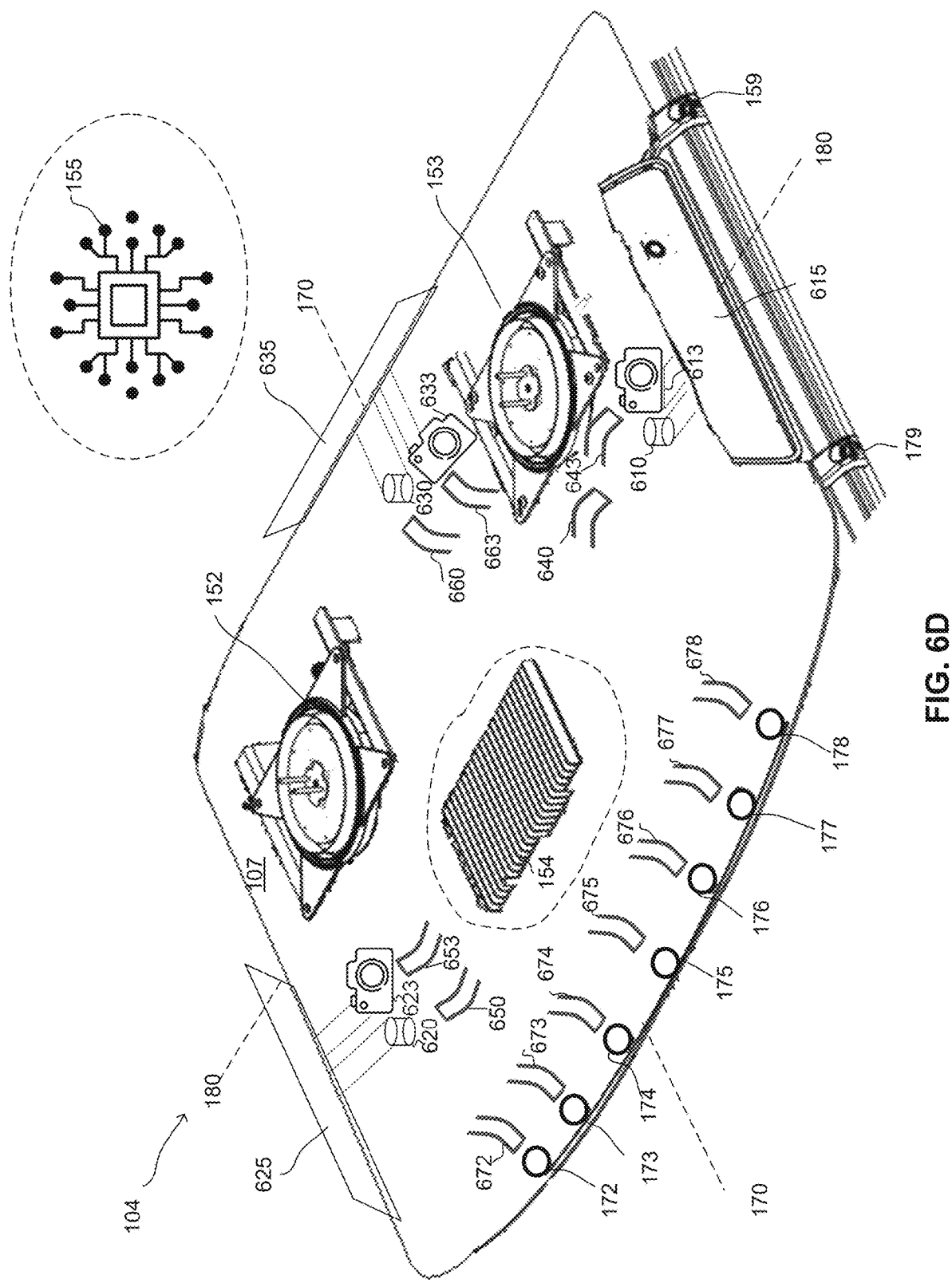
Figure 6E:
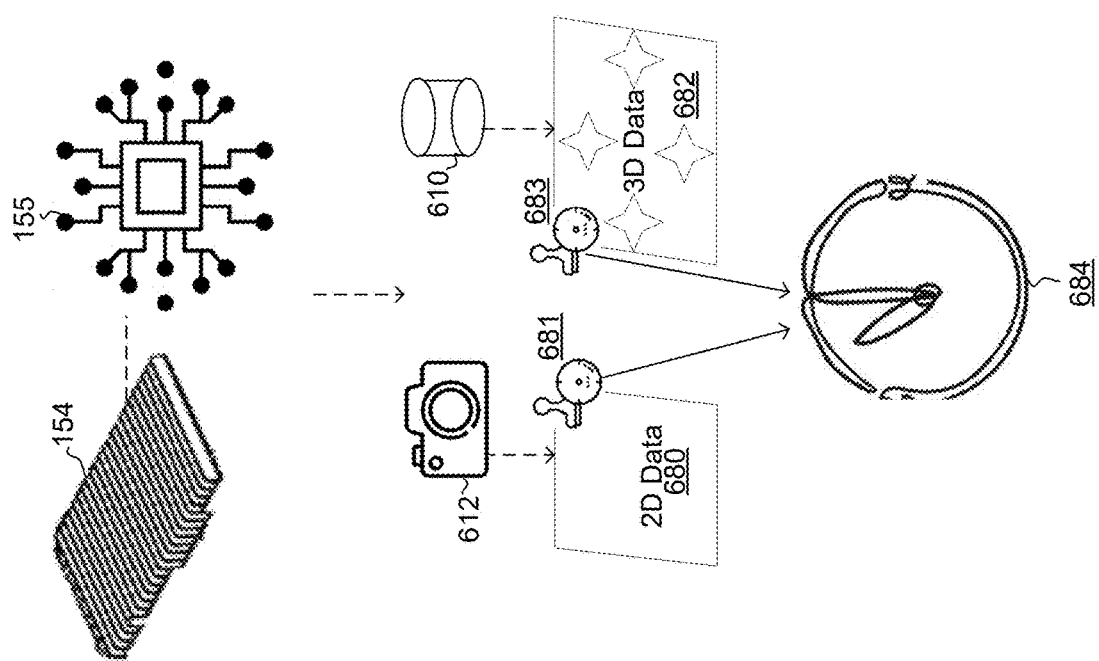
FIG. 6E illustrates an operation of a circuitry within the rear enclosure.

FIGS. 6B-6D illustrate alternative arrangements of sensors within the second enclosure 104. For example, in FIG. 6B, only the Lidar 630 may be fastened or attached to the sensor mount 635. In FIG. 6C, only a single camera or a plurality of cameras may be fastened or attached to the sensor mount 615, and only a single camera or a plurality of cameras may be fastened or attached to the sensor mount 625. In FIG. 6D, adjacent to each Lidar 610, 620, and 630 may be an individual camera 613, 623, and 633. Thus, in FIG. 6D, the rear enclosure 104 houses three Lidars and three cameras.

Figure 7:
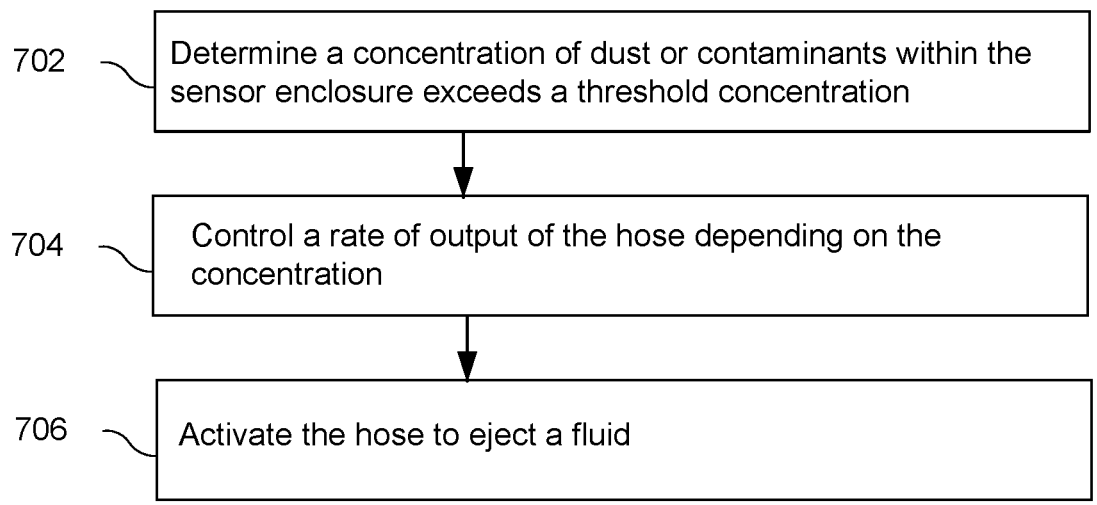
FIG. 7 illustrates a flow chart of controlling an operation of one or more cleaning nozzles or hoses within an enclosure.

FIG. 7 illustrates a flow chart of how one or more nozzles within the first enclosure 102 or the second enclosure 104 may be controlled electronically, by one or more electronic controllers (e.g., the one or more electronic controllers 190 of FIG. 1). In some examples, the one or more nozzles may be correspondingly coupled to one or more hoses. Any of the one or more hoses may contain different fluids, such as water or air that can be directed through particular one or more nozzles to clean one or more components of the first enclosure 102 or the second enclosure 104. For example, a nozzle can spray a high velocity cleaning solution onto a transparent cover of the first enclosure 102. In particular, in step 702, the electronic controllers may detect, via one or more dust sensors or air quality sensors, or via other suitable means, a level or concentration of dust or contaminants, and/or an air quality index (AQI) in different portions of the first enclosure 102 or of the second enclosure 104. The electronic controllers may detect that a concentration and/or distribution of dust or contaminants within a predefined area exceeds a threshold concentration in some portion of the first enclosure 102 or the second enclosure 104, and/or if an AQI exceeds a threshold level, at some component or region within the first enclosure 102 or the second enclosure 104. Additionally or alternatively, in some examples, the electronic controllers may detect that a rate of increase of a concentration of dust or contaminants, and/or of an AQI, exceeds a threshold rate. Upon such detection, the electronic controllers may cause the one or more hoses to direct a fluid, through the one or more nozzles, towards a direction of the component or region to spray the fluid. In some examples, each hose may be positioned towards a particular region or component, and therefore, each hose does not need to be controlled to rotate or translate towards a particular region or component. In other words, each hose may be relatively stationary. In other examples, each hose may be rotated and/or translated towards a particular region or component. In step 704, the electronic controllers may control a direction of translation or rotation of one or more hoses, in such examples. In other examples, the electronic controllers may control an intensity or rate of output, spray pattern either with respect to spray positions or timing of sprays, of a fluid from the one or more hoses, depending on the concentration of dust or contaminants, the AQI, the rate of increase of a concentration of dust or contaminants, and/or the rate of increase of the AQI. For example, a higher the concentration of dust or contaminants, a higher a rate of output or intensity that the electronic controllers may set. In step 706, the electronic controllers may activate the hose according to the controlled intensity, rate of output, and/or the spray pattern.

In some examples, the electronic controllers may control an output of the nozzles that clean a surface in an analogous manner as described above. For example, upon detecting that a concentration of dust or contaminants exceeds a threshold concentration at or near a cover of the first enclosure 102 or the second enclosure 104, the electronic controllers may activate a nozzle to discharge air in order to clean the cover. The electronic controllers may adjust an intensity or a rate of output of the nozzles based on the detected concentration.

Figure 8A:
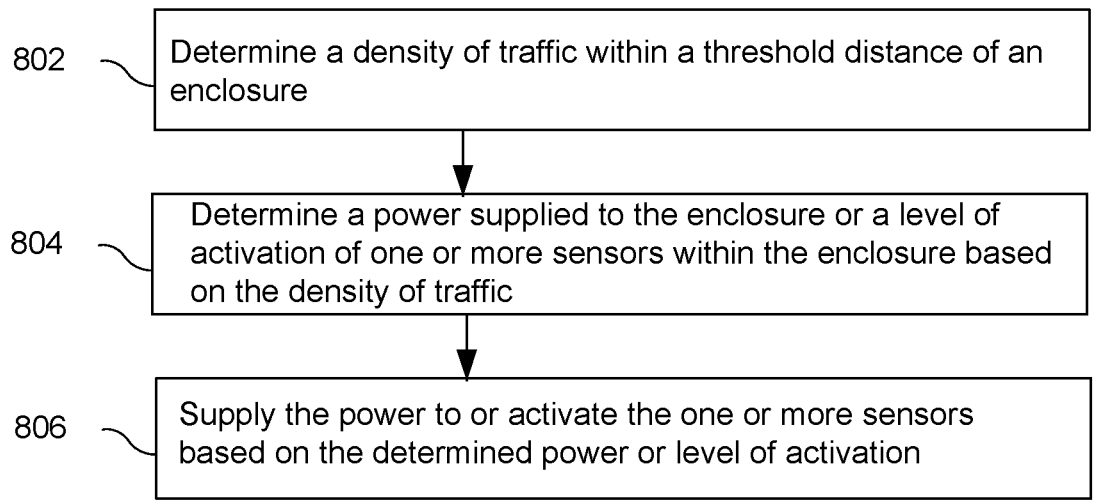
FIGS. 8A and 8B illustrate a flow chart of controlling an operation of one or more sensors within an enclosure.

FIG. 8A illustrates a flow chart of how one or more sensors within the first enclosure 102 or the second enclosure 104 may be controlled electronically, by one or more electronic controllers (e.g., the one or more electronic controllers 190 of FIG. 1). In step 802, the electronic controllers may determine a density of traffic within a threshold distance of an enclosure (e.g., the first enclosure 102 or the second enclosure 104). In step 804, the electronic controllers may determine a power supplied to the enclosure or a level of activation of one or more sensors within the enclosure based on the density of traffic. For example, the level of activation may encompass whether or not a sensor is turned on, and/or a mode in which a sensor is operated under. Some example modes include different levels of power in which the sensor is operated under, such as a low power mode in which some functionalities may be deactivated or activated at a reduced extent (e.g., sensor processing functionalities). In step 806, the electronic controllers may supply the power to or activate the one or more sensors based on the determined power or level of activation. In such a manner, the one or more electronic controllers may individually control each of the enclosures depending on certain conditions, such as density of traffic. In particular, if the density of traffic behind the vehicle is higher than the density of traffic in front of the vehicle, then the electronic controllers may adjust the level of power of the second enclosure 104 to be higher than that of the first enclosure 102, or, adjust a current power level of the second enclosure 104 and/or lower a current power level of the first enclosure 102.

Figure 8B:
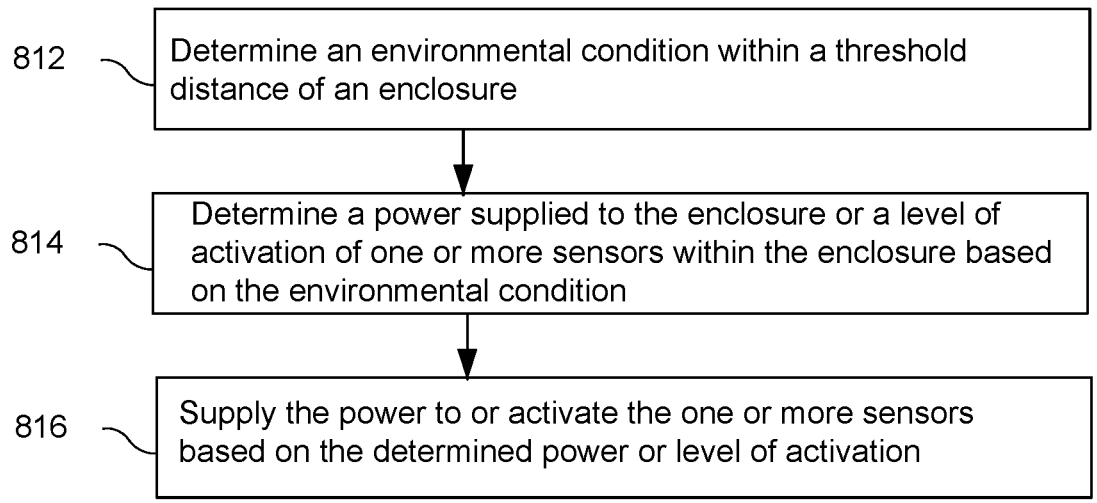

FIG. 8B illustrates a flow chart of how one or more sensors within the first enclosure 102 or the second enclosure 104 may be controlled electronically, by one or more electronic controllers (e.g., the one or more electronic controllers 190 of FIG. 1). In step 812, the electronic controllers may determine an environmental condition within a threshold distance of an enclosure (e.g., the first enclosure 102 or the second enclosure 104). The environment condition may include, for example, a visibility level, a smog level, an AQI, a level of precipitation, a level of haze, a level of dust, or other conditions. In step 814, the electronic controllers may determine a power supplied to the enclosure or a level of activation of one or more sensors within the enclosure based on the environmental condition. For example, if a level of visibility is low (e.g., below a threshold level), then the electronic controllers may supply more power to either or both the first enclosure or the second enclosure, in order to capture sensor data of a sufficient level of clarity or quality in order to detect and/or discern different objects. In step 816, the electronic controllers may supply the power to or activate the one or more sensors based on the determined power or level of activation. In such a manner, the one or more electronic controllers may individually control each of the enclosures depending on certain conditions, such as level of visibility. In particular, if a level of visibility in front of the vehicle is higher than a level of visibility behind the vehicle, then the level of power supplied to the second enclosure 104 may be higher than the lower of power supplied to the first enclosure 102.

Figure 9:
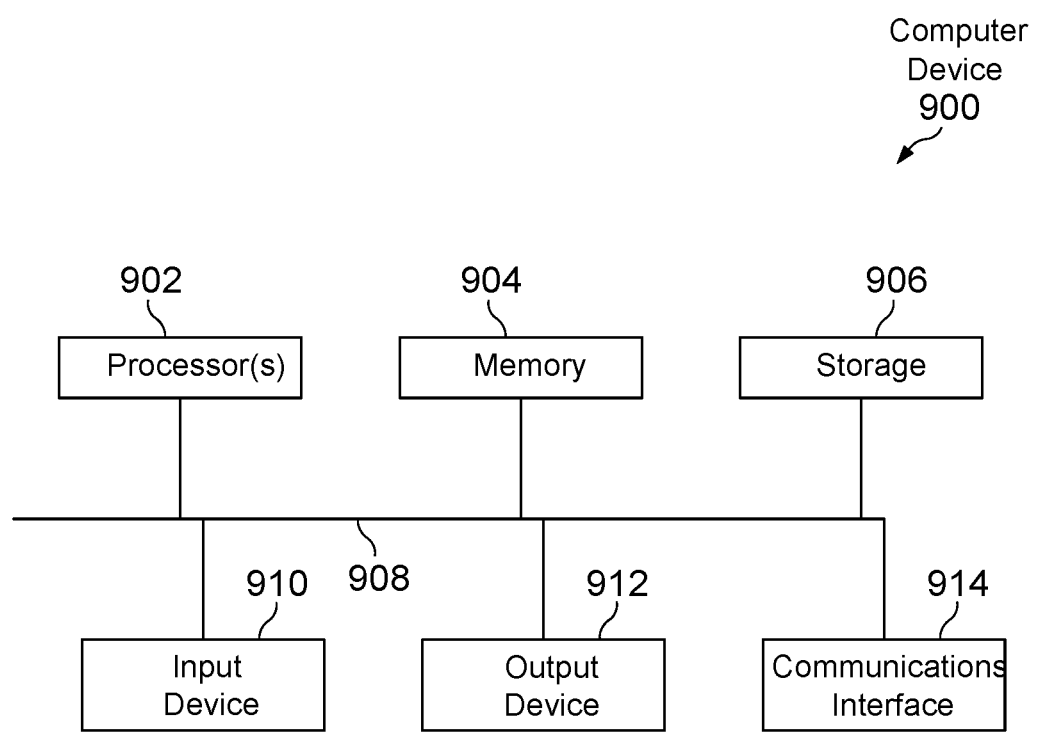
FIG. 9 illustrates a block diagram including details of a computing system.

FIG. 9 is a block diagram of a computing device 900, in accordance with some embodiments. In some embodiments, the computing device 900 may be a particular implementation of the one or more electronic processors 190, or encompass the one or more electronic processors 190, and may perform some or all of the functionality described herein. The computing device 900 comprises one or more hardware processor 902, memory 904, storage 906, an input device 910, and output device 912 and/or a communications interface 914, all communicatively coupled to a communication channel 908.

The one or more hardware processors 902 may be configured to execute executable instructions (e.g., software programs, applications). In some example embodiments, the one or more hardware processors 902 comprises circuits or any processor capable of processing the executable instructions. The one or more hardware processors may be manifested as any of central processing units (CPUs), graphics processing units (GPUs), application-specific integrated circuits (ASICs), or field programmable gate arrays (FPGAs).

The memory 904 stores working data. The memory 904 any include devices, such as RAM, ROM, RAM cache, virtual memory, etc. In some embodiments, the data within the memory 904 may be cleared or ultimately transferred to the storage 906 for more persistent retention. The term "memory" herein is intended to cover all data storage media whether permanent or temporary.

The storage 906 includes any persistent storage device. The storage 906 may include flash drives, hard drives, optical drives, cloud storage, magnetic tape and/or extensible storage devices (e.g., SD cards). Each of the memory 904 and the storage 906 may comprise a computer-readable medium, which stores instructions or programs executable by one or more hardware processors 902.

The input device 910 may include any device capable of receiving input information (e.g., a mouse, keyboard, microphone, etc.). The output device 912 includes any device capable of outputting information (e.g., speakers, screen, etc.).

The communications interface 914 may include any device capable of interfacing with external devices and/or data sources. The communications interface 914 may include an Ethernet connection, a serial connection, a parallel connection, and/or an ATA connection. The communications interface 914 may include wireless communication (e.g., 802.11, WiMax, LTE, 5G, WiFi) and/or a cellular connection. The communications interface 914 may support wired and wireless standards.

A computing device 900 may comprise more or less hardware, software and/or firmware components than those depicted (e.g., drivers, operating systems, touch screens, biometric analyzers, battery, APIs, global positioning systems (GPS) devices, various sensors and/or the like). Hardware elements may share functionality and still be within various embodiments described herein. In one example, the one or more hardware processors 902 may include a graphics processor and/or other processors.

An electronic processor may comprise hardware, software, firmware, and/or circuitry. In one example, one or more software programs comprising instructions capable of being executable by a hardware processor may perform one or more of the functions of the electronic processors described herein. Circuitry may perform the same or similar functions. The functionality of the various systems, engines, datastores, and/or databases may be combined or divided differently. Memory or storage may include cloud storage. The term "or" may be construed as inclusive or exclusive. Plural instances described herein may be replaced with singular instances. Memory or storage may include any suitable structure (e.g., an active database, a relational database, a self-referential database, a table, a matrix, an array, a flat file, a documented-oriented storage system, a non-relational No-SQL system, and the like), and may be cloud-based, hardware, or otherwise.

At least some of the operations of a method may be performed by the one or more hardware processors. The one or more hardware processors may operate partially or totally in a "cloud computing" environment or as a "software as a service" (SaaS). For example, some or all of the operations may be performed by a group of computers being accessible via a network (e.g., the Internet) and via one or more appropriate interfaces (e.g., one or more APIs).

The performance of certain of the operations may be distributed among various hardware processors, whether residing within a single machine or deployed across a number of machines. In some embodiments, the one or more hardware processors may be located in a single geographic location. In some embodiments, the one or more hardware processors may be distributed across a number of geographic locations.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A sensor enclosure assembly, comprising:
 a first enclosure positioned at a front of a vehicle roof; and
 a second enclosure positioned at a rear of the vehicle roof, wherein:
  the first enclosure and the second enclosure each comprises:
   sensors comprising at least two cameras and at least one Lidar;
   cleaning nozzles configured to direct a fluid toward an exterior cover of the first enclosure or the second enclosure; and
   a fan disposed within an interior of the first enclosure or the second enclosure and facing towards vents on an exterior of the first enclosure or the second enclosure.

2. The sensor enclosure assembly of claim 1, wherein:
 the second enclosure comprises two antennae assemblies, wherein the antennae assemblies comprise a GNSS antenna and a cellular antenna.

3. The sensor enclosure assembly of claim 1, wherein:
 the first enclosure comprises four cameras, wherein a first camera comprises a field of view of 30 degrees, a second camera comprises a field of view of 120 degrees, and a third camera comprises a field of view of 60 degrees.

4. The sensor enclosure assembly of claim 1, wherein:
 the first enclosure and the second enclosure each comprise:
  a base plate mounted to the vehicle roof or to a rack positioned on the vehicle roof; and
  three adapters that are adapted or adhered to the base plate onto the vehicle roof or to the rack.

5. The sensor enclosure assembly of claim 1, wherein:
 the second enclosure comprises a junction box disposed between antennae assemblies, wherein the junction box comprises GNSS antenna receiver electronics or circuitry, cellular antenna receiver electronics or circuitry, and time synchronization electronics or circuitry to synchronize metadata to a GNSS clock, wherein the metadata comprises timestamps corresponding to sensor data captured from one or more of the sensors.

6. The sensor enclosure assembly of claim 5, wherein the antennae assemblies are positioned above the sensor mount bracket.

7. The sensor enclosure assembly of claim 1, wherein:
 the first enclosure and the second enclosure each comprise:
  a sensor mount bracket positioned atop a base plate and upon which the sensors are disposed.

8. The sensor enclosure assembly of claim 1, wherein the second enclosure comprises vents disposed on three different sides of the second enclosure.

9. The sensor enclosure assembly of claim 1, wherein the second enclosure comprises a higher number of sensors compared to the first enclosure.

10. The sensor enclosure assembly of claim 1, wherein the second enclosure comprises a horizontal axis and a perpendicular axis intersecting through a center of the second enclosure, and the second enclosure comprises a GNSS antenna assembly that is equidistant to a cellular antenna assembly with respect to the perpendicular axis.

11. The sensor enclosure assembly of claim 1, further comprising one or more electronic controllers configured to regulate one or more operations of the sensor enclosure assembly, wherein the operations comprise operations associated with the sensors.

12. The sensor enclosure assembly of claim 11, wherein the electronic controllers are further configured to perform:
   determining a concentration of contaminants or dust within a particular component or region of the first sensor enclosure or the second sensor enclosure;
   determining that the concentration of contaminants or dust exceeds a threshold concentration; and
   in response to determining that the concentration of contaminants or dust exceeds a threshold concentration, activating one or more of the cleaning nozzles to direct the fluid towards the particular component or region.

13. The sensor enclosure assembly of claim 11, wherein the electronic controllers are further configured to perform:
   determining a rate of change over time of a concentration of contaminants or dust within a particular component or region of the first sensor enclosure or the second sensor enclosure;
   determining that the rate of change of the concentration of contaminants or dust exceeds a threshold rate; and
   in response to determining that the rate of change of the concentration of contaminants or dust exceeds a threshold rate, activating one or more of the cleaning nozzles to direct the fluid towards the particular component or region.

14. The sensor enclosure assembly of claim 11, wherein the electronic controllers are further configured to perform:
   determining an air quality index (AQI) within a particular component or region of the first sensor enclosure or the second sensor enclosure;
   determining that the AQI exceeds a threshold rate; and
   in response to determining that the AQI exceeds a threshold rate, activating one or more of the cleaning nozzles to direct the fluid towards the particular component or region.

15. The sensor enclosure assembly of claim 11, wherein the electronic controllers are further configured to perform:
   determining a rate of change of an air quality index (AQI) within a particular component or region of the first sensor enclosure or the second sensor enclosure;
   determining that the rate of change of the AQI exceeds a threshold rate; and
   in response to determining that the rate of change of the AQI exceeds a threshold rate, activating one or more of the cleaning nozzles to direct the fluid towards the particular component or region.

16. The sensor enclosure assembly of claim 12, wherein the electronic controllers are further configured to perform:
   determining an intensity or a rate of output of the one or more of the cleaning nozzles based on the concentration of contaminants or dust, and wherein the activating of the one or more of the cleaning nozzles comprises activating the one or more of the cleaning nozzles according to the intensity or the rate of output.

17. The sensor enclosure assembly of claim 11, wherein the electronic controllers are further configured to perform:
   determining a first power level to be supplied to the first enclosure based on a density of traffic in a region within a threshold distance of the first enclosure.

18. The sensor enclosure assembly of claim 11, wherein the electronic controllers are further configured to perform:
   determining a level of activation of first sensors within the first enclosure based on a density of traffic in a region within a threshold distance of the first enclosure.

19. The sensor enclosure assembly of claim 11, wherein the electronic controllers are further configured to perform:
   determining a second power level to be supplied to the second enclosure based on a density of traffic in a region within a threshold distance of the second enclosure.

20. The sensor enclosure assembly of claim 11, wherein the electronic controllers are further configured to perform:
   determining a first level of activation of first sensors within the first enclosure based on a first density of traffic in a first region within a threshold distance of the first enclosure; and
   determining a second level of activation of second sensors within the first enclosure based on a second density of traffic in a second region within a threshold distance of the second enclosure, wherein the first level of activation is different from the second level of activation.

* * * * *